(12) United States Patent  
Schmitt

(10) Patent No.: US 7,448,553 B2
(45) Date of Patent: Nov. 11, 2008

(54) FLUID MIXER

(75) Inventor: Randall Paul Schmitt, Clinton Township, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 476 days.

(21) Appl. No.: 11/109,282

(22) Filed: Apr. 19, 2005

(65) Prior Publication Data
US 2006/0231636 A1     Oct. 19, 2006

(51) Int. Cl.
*G05D 23/13* (2006.01)
(52) U.S. Cl. ............... 236/12.11; 236/12.15; 236/12.21
(58) Field of Classification Search ............... 236/12.1, 236/12.11, 12.12, 12.15, 12.16, 12.21
See application file for complete search history.

(56) References Cited

U.S. PATENT DOCUMENTS

| 3,565,791 | A |   | 2/1971  | Urquhart et al. |         |
|-----------|---|---|---------|-----------------|---------|
| 3,642,021 | A |   | 2/1972  | Muller et al.   |         |
| 3,685,541 | A |   | 8/1972  | Caparone et al. |         |
| 3,695,903 | A |   | 10/1972 | Telkes et al.   |         |
| 3,721,386 | A |   | 3/1973  | Brick et al.    |         |
| 3,750,701 | A |   | 8/1973  | Botnick         |         |
| 3,894,994 | A | * | 7/1975  | Day et al.      | 526/167 |
| 3,952,796 | A |   | 4/1976  | Larson          |         |
| 4,051,869 | A |   | 10/1977 | Holt et al.     |         |
| 4,102,354 | A |   | 7/1978  | Natale          |         |
| 4,121,761 | A |   | 10/1978 | Nolden          |         |
| 4,150,817 | A |   | 4/1979  | Regelin et al.  |         |
| 4,166,575 | A |   | 9/1979  | Sassi           |         |
| 4,170,245 | A |   | 10/1979 | Haley           |         |
| 4,181,252 | A |   | 1/1980  | Nolden          |         |
| 4,185,771 | A |   | 1/1980  | Killias         |         |
| 4,189,792 | A |   | 2/1980  | Veach           |         |
| 4,222,410 | A |   | 9/1980  | Geimer          |         |
| 4,227,548 | A |   | 10/1980 | Botnick         |         |
| 4,241,868 | A |   | 12/1980 | Perkins         |         |
| 4,258,751 | A |   | 3/1981  | Humpert         |         |
| 4,270,570 | A |   | 6/1981  | Kolze           |         |
| 4,322,031 | A |   | 3/1982  | Gehlert         |         |
| 4,330,081 | A |   | 5/1982  | McMillan        |         |
| 4,359,186 | A |   | 11/1982 | Kiendl          |         |
| 4,402,455 | A |   | 9/1983  | Kolt            |         |
| 4,406,398 | A |   | 9/1983  | Perkins         |         |
| 4,409,694 | A |   | 10/1983 | Barrett, Sr. et al. |     |
| 4,420,811 | A |   | 12/1983 | Tarnay et al.   |         |
| 4,421,269 | A |   | 12/1983 | Ts'ao           |         |
| 4,429,422 | A |   | 2/1984  | Wareham         |         |
| 4,444,357 | A |   | 4/1984  | Lynch et al.    |         |
| 4,455,475 | A |   | 6/1984  | Giorgetti       |         |
| 4,478,249 | A |   | 10/1984 | Fleischmann     |         |
| 4,503,575 | A |   | 3/1985  | Knoop et al.    |         |
| 4,524,906 | A |   | 6/1985  | Kenyon et al.   |         |
| 4,528,709 | A |   | 7/1985  | Getz            |         |
| 4,541,562 | A |   | 9/1985  | Zukausky        |         |
| 4,558,817 | A |   | 12/1985 | Kiendl          |         |

(Continued)

FOREIGN PATENT DOCUMENTS

DE          3407796 A1    9/1985

*Primary Examiner*—Marc E Norman
(74) *Attorney, Agent, or Firm*—Leon E. Redman; Lloyd D. Doigan

(57) ABSTRACT

A fluid mixer including a pair of inlets configured to impart a rotational fluid flow and a mixing element configured to facilitate fluid mixing streams.

26 Claims, 11 Drawing Sheets

U.S. PATENT DOCUMENTS

| | | |
|---|---|---|
| 4,560,284 A | 12/1985 | Chen |
| 4,563,780 A | 1/1986 | Pollack |
| 4,570,848 A | 2/1986 | McLellan |
| 4,572,238 A | 2/1986 | Stenlund |
| 4,575,262 A | 3/1986 | Andersen |
| 4,580,544 A | 4/1986 | Walker |
| 4,581,707 A | 4/1986 | Millar |
| 4,604,764 A | 8/1986 | Enzo |
| 4,618,091 A | 10/1986 | Buzzi |
| 4,630,940 A | 12/1986 | Ostertag et al. |
| 4,635,844 A | 1/1987 | Barrett, Sr. et al. |
| 4,645,489 A | 2/1987 | Krumme et al. |
| 4,674,678 A | 6/1987 | Knebel et al. |
| 4,682,626 A | 7/1987 | Bergmann |
| 4,682,728 A | 7/1987 | Oudenhoven et al. |
| 4,693,415 A | 9/1987 | Sturm |
| 4,694,512 A | 9/1987 | Knebel et al. |
| 4,700,884 A | 10/1987 | Barrett et al. |
| 4,700,885 A | 10/1987 | Knebel |
| 4,706,703 A | 11/1987 | Takeuchi et al. |
| 4,709,728 A | 12/1987 | Ying-Chung |
| 4,711,392 A | 12/1987 | Kidouchi et al. |
| 4,713,525 A | 12/1987 | Eastep |
| 4,735,357 A | 4/1988 | Gregory et al. |
| 4,739,923 A | 4/1988 | Tsutsui et al. |
| 4,740,089 A | 4/1988 | Fiorentini |
| 4,742,456 A | 5/1988 | Kamena |
| 4,756,030 A | 7/1988 | Juliver |
| 4,757,943 A | 7/1988 | Sperling et al. |
| 4,762,273 A | 8/1988 | Gregory et al. |
| 4,763,681 A | 8/1988 | Cuny et al. |
| 4,768,705 A | 9/1988 | Tsutsui et al. |
| 4,842,191 A | 6/1989 | Bergmann |
| 4,854,498 A | 8/1989 | Stayton |
| 4,854,499 A | 8/1989 | Neuman |
| 4,863,098 A | 9/1989 | Kolze et al. |
| 4,867,375 A | 9/1989 | Ueki et al. |
| 4,869,427 A | 9/1989 | Kawamoto et al. |
| 4,870,986 A | 10/1989 | Barrett et al. |
| 4,873,830 A | 10/1989 | Blattler |
| 4,875,623 A | 10/1989 | Garris |
| 4,886,207 A | 12/1989 | Lee et al. |
| 4,896,101 A | 1/1990 | Cobb |
| 4,896,658 A | 1/1990 | Yonekubo et al. |
| 4,901,915 A | 2/1990 | Sakakibara |
| 4,909,435 A | 3/1990 | Kidouchi et al. |
| 4,921,162 A | 5/1990 | Blattler |
| 4,923,116 A | 5/1990 | Homan |
| 4,924,900 A | 5/1990 | Taube, Sr. et al. |
| 4,926,897 A | 5/1990 | Perrot |
| 4,928,732 A | 5/1990 | Hu |
| 4,931,938 A | 6/1990 | Hass |
| 4,936,347 A | 6/1990 | Oracz et al. |
| 4,941,608 A | 7/1990 | Shimizu et al. |
| 4,942,739 A | 7/1990 | Uda et al. |
| 4,945,943 A | 8/1990 | Cogger |
| 4,953,236 A | 9/1990 | Lee et al. |
| 4,955,535 A | 9/1990 | Tsutsui et al. |
| 4,965,894 A | 10/1990 | Baus |
| 4,967,794 A | 11/1990 | Tsutsui et al. |
| 4,968,152 A | 11/1990 | Bergmann |
| 4,969,576 A | 11/1990 | Merrill et al. |
| 4,969,598 A | 11/1990 | Garrs |
| 4,971,106 A | 11/1990 | Tsutsui et al. |
| 4,976,460 A | 12/1990 | Newcombe et al. |
| 4,978,058 A | 12/1990 | Duncan et al. |
| 4,984,314 A | 1/1991 | Weigert |
| 4,986,470 A | 1/1991 | Yamazaki |
| 4,994,792 A | 2/1991 | Ziegler, Jr. |
| 5,032,992 A | 7/1991 | Bergmann |
| 5,033,671 A | 7/1991 | Shiba et al. |
| 5,038,420 A | 8/1991 | Chen |
| 5,050,062 A | 9/1991 | Hass |
| 5,050,641 A | 9/1991 | Shwu-Fen |
| 5,058,389 A | 10/1991 | Yasuda et al. |
| 5,058,624 A | 10/1991 | Kolze |
| 5,058,804 A | 10/1991 | Yonekubo et al. |
| 5,067,333 A | 11/1991 | Duncan et al. |
| 5,074,520 A | 12/1991 | Lee et al. |
| 5,085,399 A | 2/1992 | Tsutsui et al. |
| 5,085,948 A | 2/1992 | Tsukamoto et al. |
| 5,095,945 A | 3/1992 | Jensen |
| 5,109,347 A | 4/1992 | Quick, Jr. et al. |
| 5,111,969 A | 5/1992 | Knepler |
| 5,125,433 A | 6/1992 | DeMoss et al. |
| 5,139,044 A | 8/1992 | Otten et al. |
| 5,148,824 A | 9/1992 | Wilson et al. |
| 5,170,361 A | 12/1992 | Reed |
| 5,170,514 A | 12/1992 | Weigert |
| 5,171,429 A | 12/1992 | Yasuo |
| 5,174,495 A | 12/1992 | Eichholz et al. |
| 5,184,642 A | 2/1993 | Powell |
| 5,197,508 A | 3/1993 | Gottling et al. |
| 5,199,790 A | 4/1993 | Pawelzik et al. |
| 5,206,963 A | 5/1993 | Wiens |
| 5,215,251 A | 6/1993 | Volk, Jr. et al. |
| 5,224,509 A | 7/1993 | Tanaka et al. |
| 5,240,028 A | 8/1993 | Hoch, Jr. et al. |
| 5,255,844 A | 10/1993 | Miller et al. |
| 5,261,597 A | 11/1993 | Perlman et al. |
| 5,273,208 A | 12/1993 | Herrick |
| 5,287,570 A | 2/1994 | Peterson et al. |
| 5,294,045 A | 3/1994 | Harris |
| 5,294,051 A | 3/1994 | Piegari |
| 5,295,274 A | 3/1994 | Daniels et al. |
| 5,299,775 A | 4/1994 | Kolze |
| 5,303,731 A | 4/1994 | Vavra et al. |
| 5,322,086 A | 6/1994 | Sullivan |
| 5,329,949 A | 7/1994 | Moncourtois et al. |
| 5,339,859 A | 8/1994 | Bowman |
| 5,348,223 A | 9/1994 | Sonesson et al. |
| 5,350,112 A | 9/1994 | Stein |
| 5,358,177 A | 10/1994 | Cashmore |
| 5,358,213 A | 10/1994 | Pilolla |
| 5,361,215 A | 11/1994 | Tompkins et al. |
| 5,400,961 A | 3/1995 | Tsutsui et al. |
| 5,411,241 A | 5/1995 | Nilsson et al. |
| 5,417,404 A | 5/1995 | Varden |
| 5,428,850 A | 7/1995 | Hiraishi et al. |
| RE35,018 E | 8/1995 | Homan |
| 5,452,740 A | 9/1995 | Bowman |
| 5,459,890 A | 10/1995 | Jarocki |
| 5,462,224 A | 10/1995 | Enoki et al. |
| 5,494,077 A | 2/1996 | Enoki et al. |
| 5,504,950 A | 4/1996 | Natalizia et al. |
| 5,506,391 A | 4/1996 | Burayez et al. |
| 5,511,723 A | 4/1996 | Eki et al. |
| 5,518,311 A | 5/1996 | Althaus et al. |
| 5,550,753 A | 8/1996 | Tompkins et al. |
| 5,551,630 A | 9/1996 | Enoki et al. |
| 5,564,462 A | 10/1996 | Storch |
| 5,577,660 A | 11/1996 | Hansen |
| 5,588,636 A | 12/1996 | Eichholz et al. |
| 5,598,973 A | 2/1997 | Weston |
| 5,694,653 A | 12/1997 | Harald |
| 5,755,262 A | 5/1998 | Pilolla |
| 5,779,139 A | 7/1998 | Ueno |
| 5,810,474 A | 9/1998 | Hidalgo |
| 5,829,072 A | 11/1998 | Hirsch et al. |
| 5,845,844 A | 12/1998 | Zosimodis |
| 5,855,356 A | 1/1999 | Fait |
| 5,860,596 A | 1/1999 | Kolt |
| 5,873,518 A | 2/1999 | Richmond et al. |
| 5,889,684 A | 3/1999 | Ben-David et al. |

| | | |
|---|---|---|
| 5,904,292 A | 5/1999 | McIntosh |
| 5,927,332 A | 7/1999 | Richard |
| 5,931,374 A | 8/1999 | Knapp |
| 5,941,635 A | 8/1999 | Stewart |
| 5,966,753 A | 10/1999 | Gauthier et al. |
| 5,970,528 A | 10/1999 | Shirai et al. |
| 5,975,124 A | 11/1999 | Stevens, II |
| 5,979,775 A | 11/1999 | Raya |
| 5,979,776 A | 11/1999 | Williams |
| 6,003,182 A | 12/1999 | Song |
| 6,024,290 A | 2/2000 | Dosani et al. |
| 6,029,094 A | 2/2000 | Diffutt |
| 6,044,857 A | 4/2000 | Stege |
| 6,050,296 A | 4/2000 | Hoffmann et al. |
| 6,059,192 A | 5/2000 | Zosimadis |
| 6,079,625 A | 6/2000 | Lebkuchner |
| 6,097,993 A | 8/2000 | Skupin et al. |
| 6,123,094 A | 9/2000 | Breda |
| 6,132,085 A | 10/2000 | Bergeron |
| 6,168,949 B1 | 1/2001 | Rubenberger |
| 6,195,588 B1 | 2/2001 | Gauthier et al. |
| 6,199,587 B1 | 3/2001 | Shlomi et al. |
| 6,219,859 B1 | 4/2001 | Derakhshan |
| 6,234,670 B1 | 5/2001 | Bergeron |
| 6,237,853 B1 | 5/2001 | Bergmann |
| 6,239,708 B1 | 5/2001 | Young |
| 6,241,379 B1 | 6/2001 | Larsen |
| 6,250,558 B1 | 6/2001 | Dogre Cuevas |
| 6,250,601 B1 | 6/2001 | Kolar et al. |
| 6,253,624 B1 | 7/2001 | Broden et al. |
| 6,264,121 B1 | 7/2001 | McClary |
| 6,270,014 B1 | 8/2001 | Bollas et al. |
| 6,273,394 B1 | 8/2001 | Vincent et al. |
| 6,279,777 B1 | 8/2001 | Goodin |
| 6,286,464 B1 | 9/2001 | Abraham et al. |
| 6,286,764 B1 | 9/2001 | Garvey et al. |
| 6,290,139 B1 | 9/2001 | Kolze |
| 6,294,786 B1 | 9/2001 | Marcichow et al. |
| 6,305,610 B1 | 10/2001 | Estes |
| 6,305,663 B1 | 10/2001 | Miller |
| 6,315,208 B1 | 11/2001 | Doyle |
| 6,317,717 B1 | 11/2001 | Lindsey et al. |
| 6,321,785 B1 | 11/2001 | Bergmann |
| 6,336,233 B1 | 1/2002 | Shaw et al. |
| 6,340,032 B1 | 1/2002 | Zosimadis |
| 6,352,106 B1 | 3/2002 | Hartman |
| 6,363,549 B2 | 4/2002 | Humpert |
| 6,378,545 B1 | 4/2002 | Bozkan et al. |
| 6,382,252 B1 | 5/2002 | Moore et al. |
| 6,390,125 B2 | 5/2002 | Pawelzik et al. |
| 6,394,361 B1 | 5/2002 | Fridmann et al. |
| 6,405,932 B1 | 6/2002 | Palmer |
| 6,408,881 B2 | 6/2002 | Lorenzelli et al. |
| 6,435,213 B2 | 8/2002 | Lou |
| 6,438,770 B1 | 8/2002 | Hed et al. |
| 6,445,880 B1 | 9/2002 | Hollander et al. |
| 6,446,875 B1 | 9/2002 | Brooks et al. |
| RE37,888 E | 10/2002 | Cretu-Petra |
| 6,463,999 B1 | 10/2002 | Jung |
| 6,464,210 B1 | 10/2002 | Teran et al. |
| 6,473,917 B1 | 11/2002 | Mateina |
| 6,478,285 B1 | 11/2002 | Bergmann |
| 6,481,029 B1 | 11/2002 | Mateina |
| 6,481,634 B1 | 11/2002 | Zosimadis |
| 6,497,372 B2 | 12/2002 | Lee et al. |
| 6,513,787 B1 | 2/2003 | Jeromson et al. |
| 6,517,006 B1 | 2/2003 | Knapp |
| 6,543,478 B2 | 4/2003 | Kline |
| 6,549,816 B2 | 4/2003 | Gauthier et al. |
| 6,554,196 B2 | 4/2003 | Sasayama et al. |
| 6,557,785 B1 | 5/2003 | Knapp |
| 6,601,986 B2 | 8/2003 | Jang et al. |
| 6,619,320 B2 | 9/2003 | Parsons |
| 6,629,645 B2 | 10/2003 | Mountford et al. |
| 6,637,668 B2 | 10/2003 | Eveleigh |
| 6,641,727 B1 | 11/2003 | Aldred et al. |
| 6,655,829 B1 | 12/2003 | Vanden Bussche et al. |
| 6,659,361 B2 | 12/2003 | Sasayama et al. |
| 6,669,843 B2 | 12/2003 | Arnaud |
| 6,676,024 B1 | 1/2004 | McNerney et al. |
| 6,679,476 B2 | 1/2004 | Noyes et al. |
| 6,691,338 B2 | 2/2004 | Zieger |
| 6,701,194 B2 | 3/2004 | Gauthier et al. |
| 6,705,534 B1 | 3/2004 | Mueller |
| 6,708,895 B1 | 3/2004 | Knapp |
| 6,713,036 B1 | 3/2004 | Vanden Bussche et al. |
| 6,715,731 B1 | 4/2004 | Post et al. |
| 6,722,575 B1 | 4/2004 | Gagne et al. |
| 6,769,252 B2 | 8/2004 | Smith |
| 6,776,395 B1 | 8/2004 | Meier |
| 6,805,330 B2 | 10/2004 | Bush |
| 6,811,713 B2 | 11/2004 | Arnaud |
| 6,820,816 B1 | 11/2004 | Reid |
| 6,823,892 B1 | 11/2004 | Knapp |
| 6,826,455 B1 | 11/2004 | Iott et al. |
| 6,854,658 B1 | 2/2005 | Houghton et al. |
| 7,175,099 B2 * | 2/2007 | Bilyard et al. ............ 236/12.11 |
| 2001/0020645 A1 | 9/2001 | Mountford et al. |
| 2001/0044954 A1 | 11/2001 | DiCarlo |
| 2002/0020179 A1 | 2/2002 | Winkler |
| 2002/0029416 A1 | 3/2002 | Shaw et al. |
| 2002/0148040 A1 | 10/2002 | Mateina |
| 2002/0179723 A1 | 12/2002 | Wack et al. |
| 2003/0052007 A1 | 3/2003 | Paul et al. |
| 2003/0075611 A1 * | 4/2003 | Eveleigh ................. 236/12.16 |
| 2003/0080194 A1 | 5/2003 | O'Hara et al. |
| 2003/0088338 A1 | 5/2003 | Phillips et al. |
| 2003/0125842 A1 | 7/2003 | Chang et al. |
| 2003/0126993 A1 | 7/2003 | Lassota et al. |
| 2003/0218074 A1 | 11/2003 | Beck et al. |
| 2004/0000594 A1 | 1/2004 | Beck et al. |
| 2004/0041033 A1 | 3/2004 | Kemp |
| 2004/0041034 A1 | 3/2004 | Kemp |
| 2004/0134545 A1 | 7/2004 | Ford |
| 2004/0193326 A1 | 9/2004 | Phillips et al. |
| 2007/0057215 A1 | 3/2007 | Parsons et al. |

\* cited by examiner

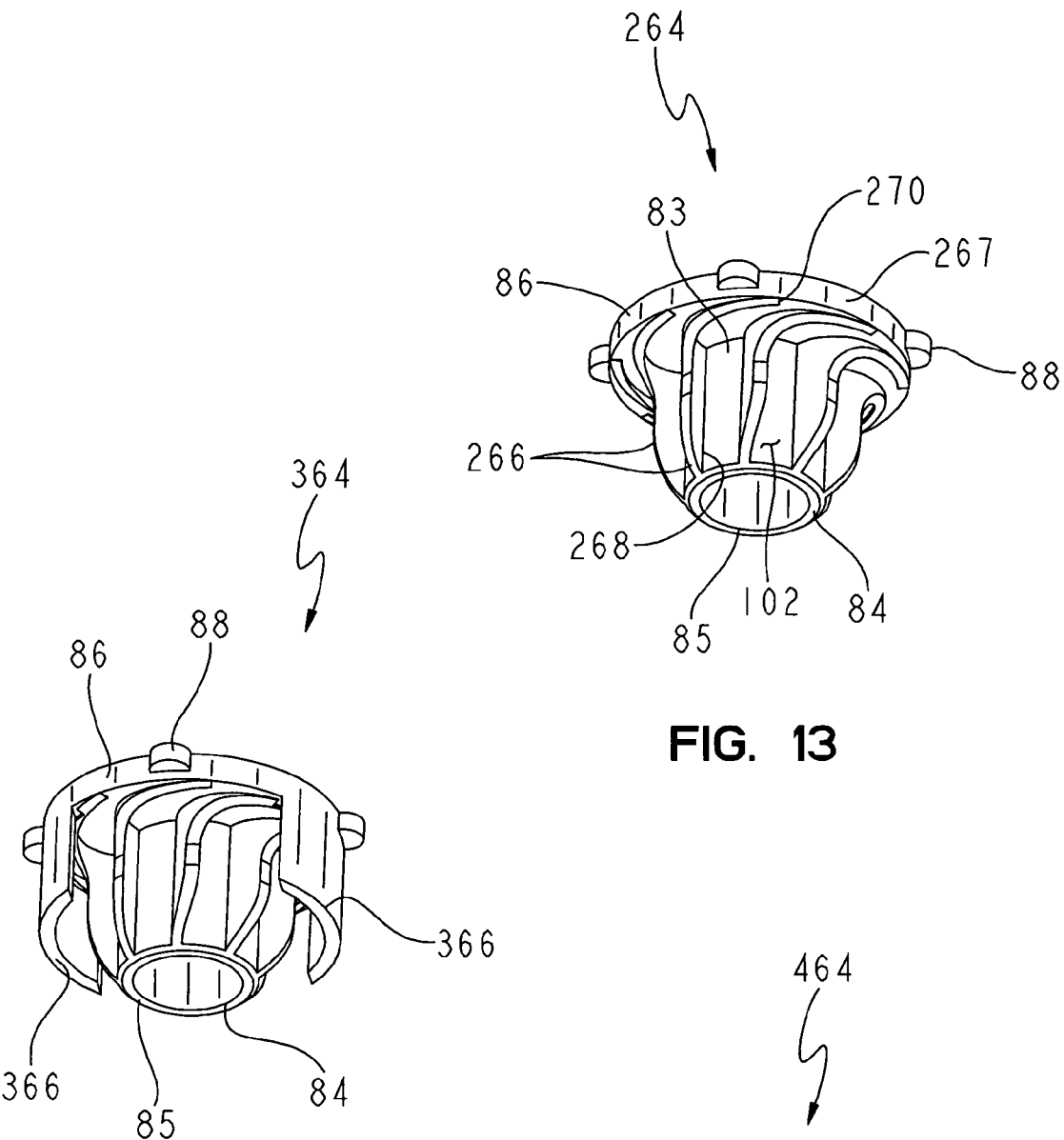
FIG. 13
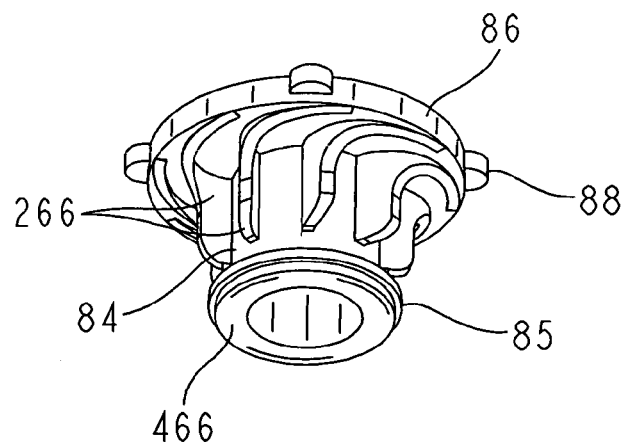
FIG. 14
FIG. 15

FLUID MIXER

BACKGROUND AND SUMMARY OF THE INVENTION

The present invention relates to a fluid delivery system and, more particularly, to an apparatus and method for mixing fluids.

Systems for mixing cold water and hot water in a manner providing for a mixed water of a desired temperature are well known in the art. One prior art system includes a two-handle faucet having a cold water control valve and a hot water control valve configured to supply cold water and hot water at a mixing chamber, typically a "T" connection. Such a mixing chamber usually causes the cold water and the hot water to flow against each other since they are supplied in substantially opposite directions. The opposing flows of the cold water and the hot water cause a back pressure, or pressure drop, to develop at the mixing point. Back pressure is proportional to the water flow and results in reduced water flow through the system. As such, back pressure results in a lower flow rate of mixed water.

Further, conventional mixing chambers often do not provide for efficient mixing of the cold water and the hot water, resulting in mixed water having stratified hot and cold portions. Complete mixing of the cold water and the hot water into mixed water with no significant temperature stratification usually only occurs after an extended run of water through the outlet piping.

According to an illustrative embodiment of the present invention, a fluid mixer includes a housing having an outer wall defining a mixing chamber. A cold water inlet is in fluid communication with the mixing chamber and is configured to supply a combined cold water stream to the mixing chamber. A hot water inlet is in fluid communication with the mixing chamber and is configured to supply a combined hot water stream to the mixing chamber. A mixed water outlet is in fluid communication with the mixing chamber and is configured to receive a combined mixed water stream from the mixing chamber. A mixing element is received within the mixing chamber, the mixing element including a hub and a plurality of blades extending outwardly from the hub. A mixing passageway is defined within the mixing chamber intermediate the hub of the mixing element and the outer wall of the housing. The cold water inlet and the hot water inlet are arranged to impart rotational flow to the combined cold water stream and the combined hot water stream within the mixing passageway. The plurality of blades extend transverse to the mixing passageway.

According to a further illustrative embodiment of the present invention, a method of mixing a hot water stream and a cold water stream to produce a mixed water stream is provided. The method includes the steps of providing a mixing passageway, supplying a combined cold water stream to the mixing passageway, and rotating the combined cold water stream within the mixing passageway. The method further includes the steps of supplying a combined hot water stream to the mixing passageway, and rotating the combined hot water stream within the mixing passageway. The method also includes the steps of separating the combined cold water stream into a plurality of component cold water streams, separating the combined hot water stream into a plurality of component hot water streams, and mixing the component cold water streams with the component hot water streams into a combined mixed water stream.

According to yet another illustrative embodiment of the present invention, a fluid mixer includes a housing having a first chamber and a second chamber in longitudinally spaced relation to the first chamber. A hub is positioned within the housing, and a plurality of first blades extend laterally outwardly from the hub and are positioned within the first chamber. A plurality of second blades extending laterally outwardly from the hub and are positioned within the second chamber in spaced relation to the plurality of first blades. An outlet is in fluid communication with the second chamber.

According to a further illustrative embodiment of the present invention, a fluid mixer includes a housing defining a mixing chamber. A cold water inlet is in fluid communication with the mixing chamber and is configured to supply cold water. A hot water inlet is in fluid communication with the mixing chamber and is configured to supply hot water. A mixing element including a hub is positioned within the housing. The mixing element is configured to combine the cold water and the hot water to produce a mixed water. A mixed water passageway extends through the hub. A first outlet is in fluid communication with the mixing chamber and the mixed water passageway. Further illustratively, a second outlet is in fluid communication with the mixing chamber and the mixed water passageway. The mixed water passageway is in spaced relation to the first outlet, and the mixed water passageway fluidly connects the mixing chamber to the second outlet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 13 is a perspective view of an alternative embodiment mixing element of the present invention;

FIG. 14 is a perspective view of a further alternative embodiment mixing element of the present invention; and FIG. 15 is a perspective view of a further alternative embodiment mixing element of the present invention.

DETAILED DESCRIPTION OF THE DRAWINGS

Figure 1:
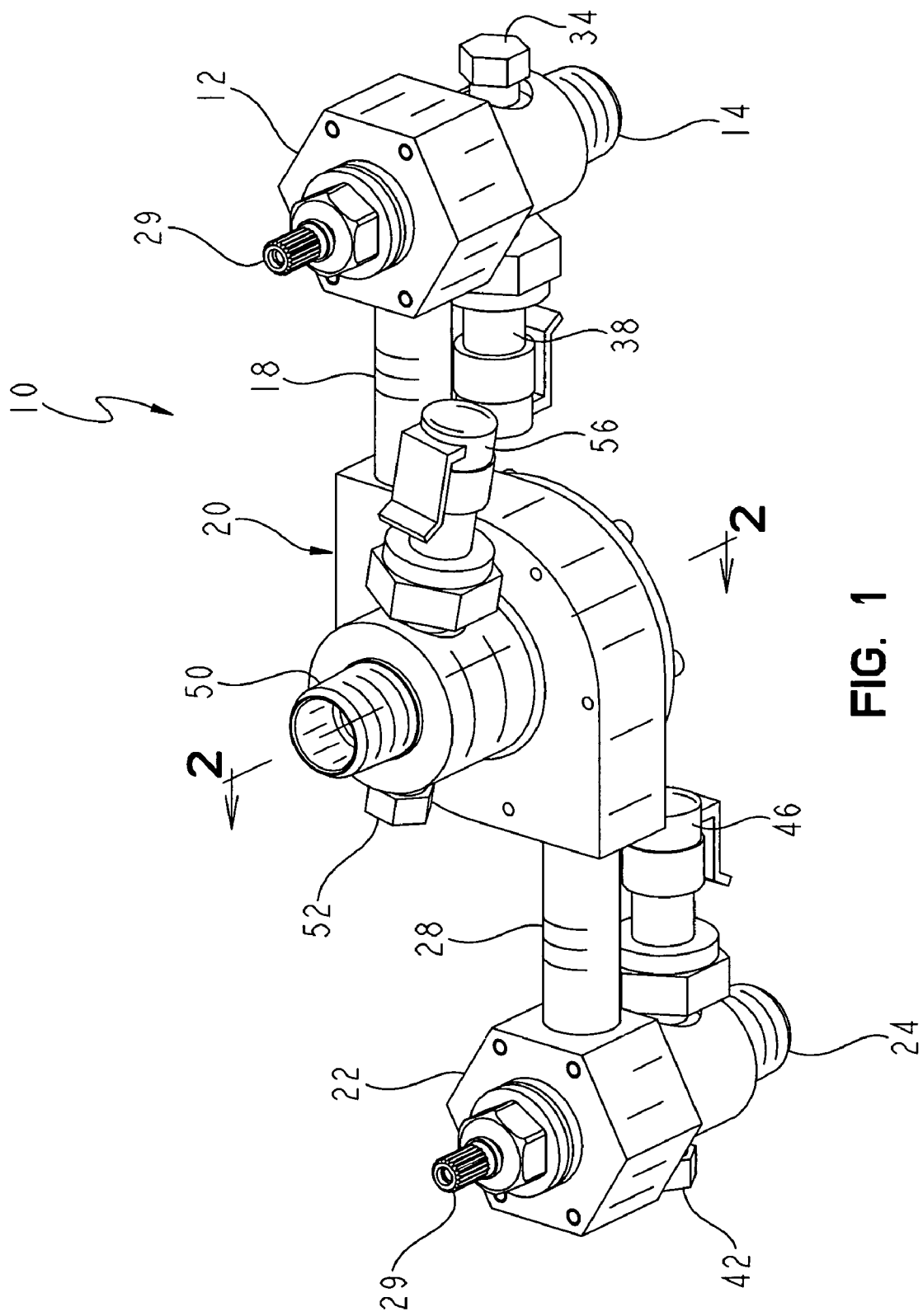
FIG. 1 is a perspective view of an illustrative embodiment fluid delivery system incorporating a fluid mixer according to the present invention, with the servo motors removed to reveal the valving members.
Figure 2:
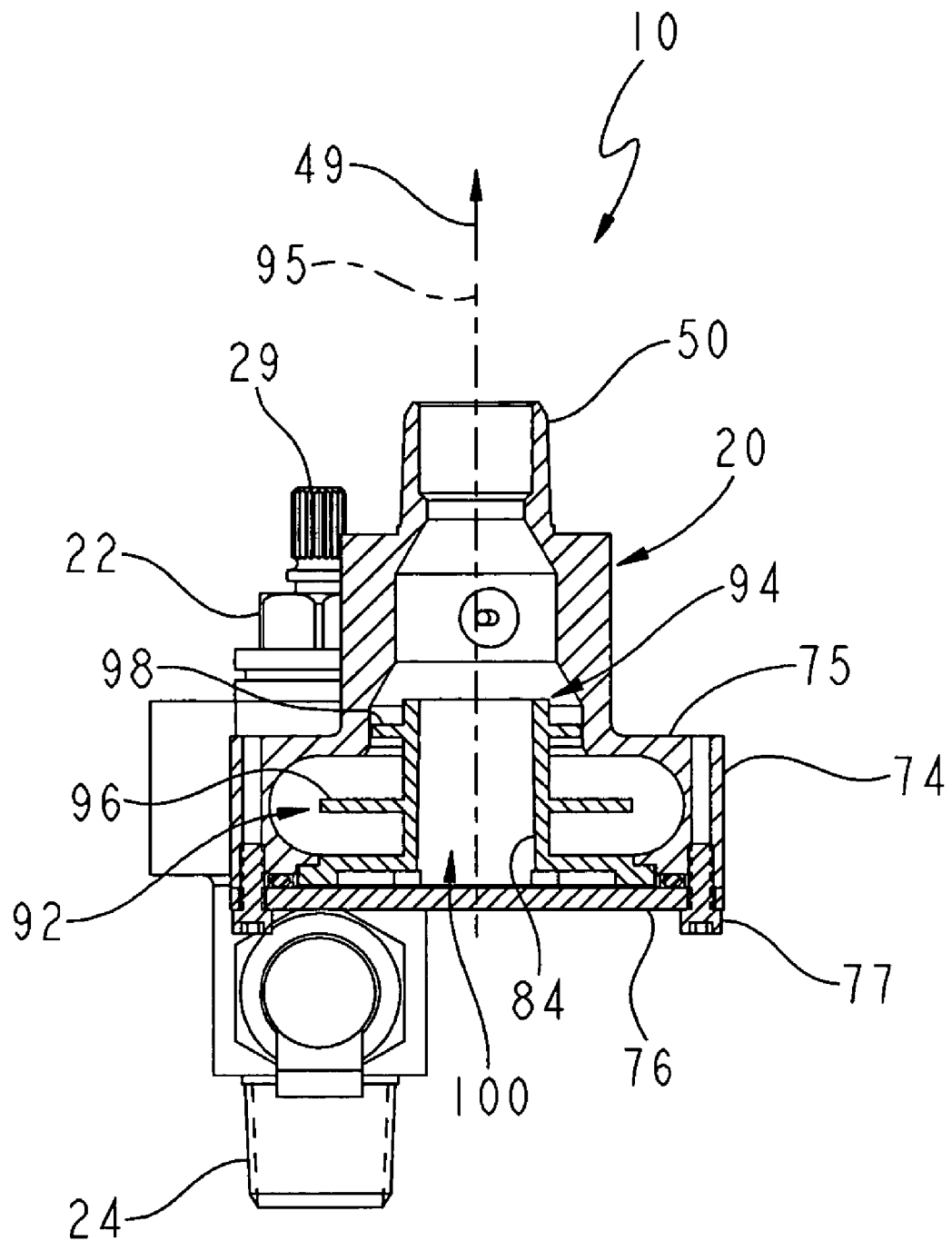
FIG. 2 is a cross-sectional view taken along line 2-2 of FIG. 1.
Figure 3:
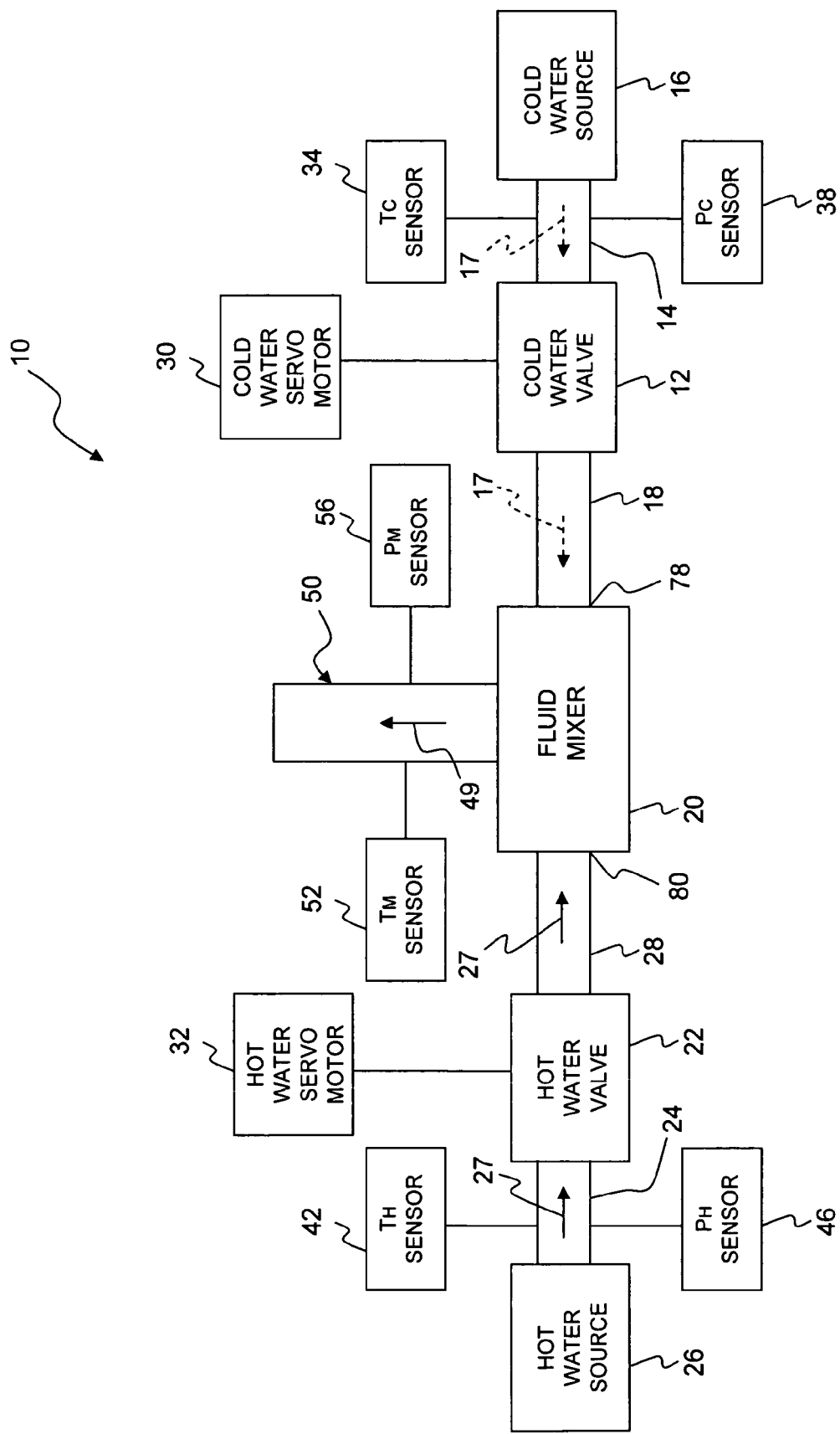
FIG. 3 is a block diagram of the fluid delivery system of FIG. 1.

Referring initially to FIGS. 1-3, the water delivery system 10 of the illustrative embodiment includes a cold water valve 12 having an inlet 14 configured to be coupled to a cold water source 16 for receiving a combined cold water stream 17. An outlet 18 of the cold water valve 12 is in fluid communication with a fluid mixer 20. Similarly, a hot water valve 22 has an inlet 24 configured to be coupled to a hot water source 26 for receiving a combined hot water stream 27. An outlet 28 of the hot water valve 22 is in fluid communication with the fluid mixer 20.

Both the cold water valve 12 and the hot water valve 22 may be of conventional design and illustratively include a rotatable valving member 29, wherein rotation of the valving member 29 increases or decreases the rate of water flow through the respective valve 12, 22. Illustratively, the valving members 29 are of a low torque ceramic disk variety that require reduced energy to operate and are field replaceable. It should be appreciated that other suitable valves may be readily substituted therefor.

With further reference to FIGS. 1 and 3, a cold water servo motor 30 is operably coupled to the cold water valve 12, while a hot water servo motor 32 is operably coupled to the hot water valve 22. More particularly, the cold water servo motor 30 and the hot water servo motor 32 are each coupled to the respective rotatable valving member 29 of the cold water valve 12 and the hot water valve 22. As such, operation of the servo motor 30 adjusts the flow of the combined cold water stream 17 through the cold water valve 12, and operation of the servo motor 32 adjusts the flow of the combined hot water stream 27 through the hot water valve 22. Again, each servo motor 30, 32 may be of conventional design and illustratively comprise Model No. HS 5475 HB available from Hitec RCD USA, Inc. of Poway, Calif. While servo motors 30, 32 are utilized in the illustrative embodiment, it should be appreciated that other suitable actuators, such as DC motors, may be substituted therefor.

In the illustrative embodiment, a cold water temperature sensor 34 is operably coupled to the inlet 14 of the cold water valve 12 and is configured to measure a temperature ($T_C$) of the combined cold water stream 17 flowing therethrough. Similarly, a cold water pressure sensor 38 is operably coupled to the inlet 14 of the cold water valve 12 and is configured to measure a pressure ($P_C$) of the combined cold water stream 17 therein. A hot water temperature sensor 42 is operably coupled to the inlet 24 of the hot water valve 22 and is configured to measure a temperature ($T_H$) of the combined hot water stream 27 flowing into the hot water valve 22. Similarly, a hot water pressure sensor 46 is operably coupled to the inlet 24 of the hot water valve 22 and is configured to measure a pressure ($P_H$) of the combined hot water stream 27 contained therein.

As further detailed herein, the mixer 20 receives the combined cold water stream 17 from the outlet 18 of the cold water valve 12 and the combined hot water stream 27 from the outlet 28 of the hot water valve 22, and forms a combined mixed water stream 49 which is then discharged through a mixed water outlet 50. A mixed water temperature sensor 52 is operably coupled to the mixed water outlet 50 and is configured to measure the temperature ($T_M$) of the combined mixed water stream 49 flowing therethrough. A mixed water pressure sensor 56 is operably coupled to the mixed water outlet 50 and is configured to measure the pressure ($P_M$) of the combined mixed water stream 49 contained therein.

The cold water temperature sensor 34, the cold water pressure sensor 38, the hot water temperature sensor 42, the hot water pressure sensor 46, the mixed water temperature sensor 52, and the mixed water pressure sensor 56 are all operably coupled to a controller (not shown). The controller illustratively receives signals from the sensors 34, 38, 42, 46, 52, and 56, and in response thereto controls operation of the cold water servo motor 30 to adjust the flow of the combined cold water stream 17 through the cold water valve 12 and controls operation of the hot water servo motor 32 to adjust the flow of the combined hot water stream 27 through the hot water valve 22. Additional details of an illustrative embodiment control system for use in connection with the mixer 20 of the present invention are detailed in U.S. patent application Ser. No. 11/109,281, filed Apr. 19, 2005, entitled "Electronic Proportioning Valve", which is assigned to the assignee of the present invention and is expressly hereby incorporated by reference.

Figure 4:
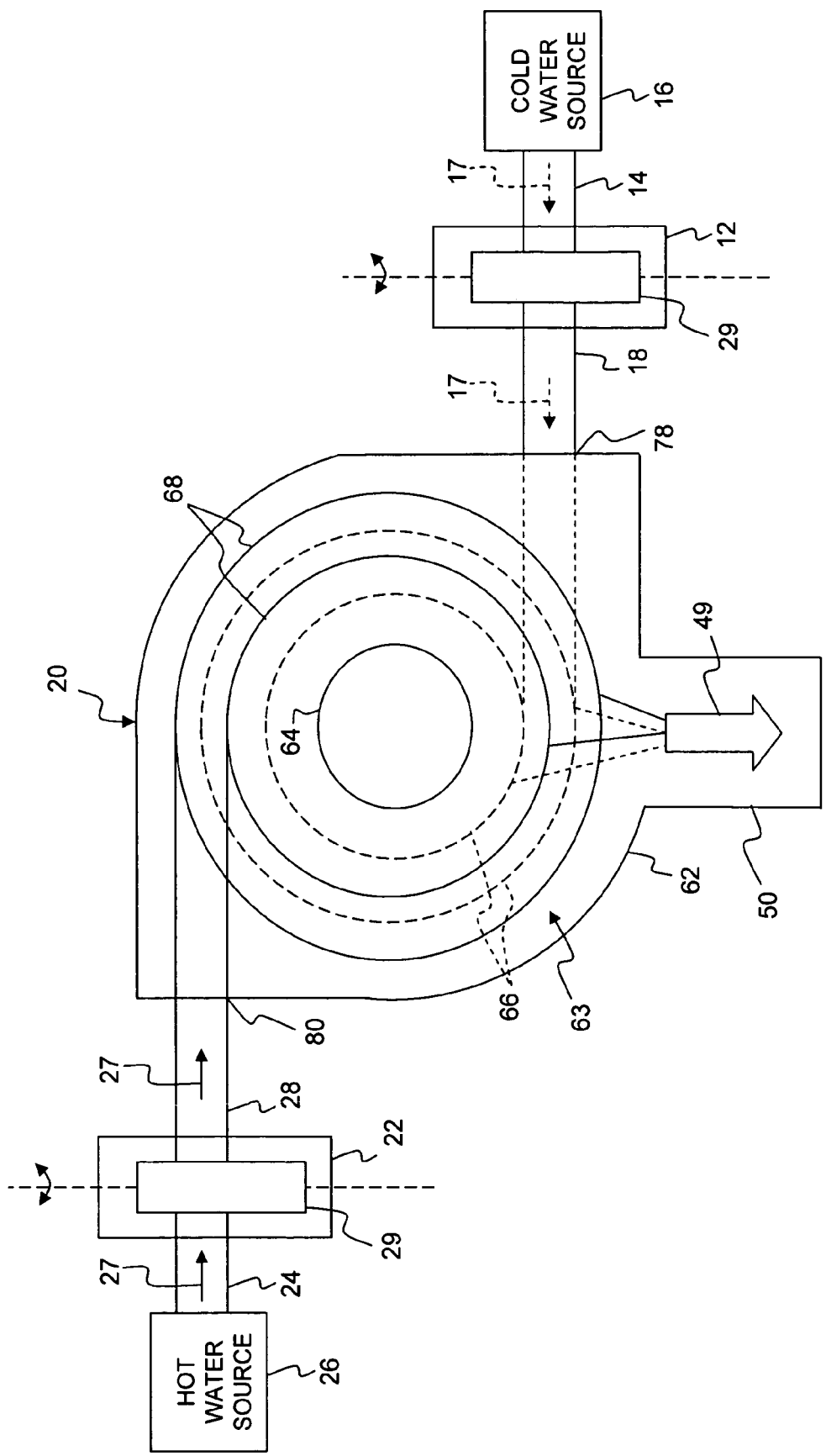
FIG. 4 is a schematic representation of the fluid mixer of FIG. 1.

With further reference to FIG. 4, the mixer 20 is schematically illustrated as including a housing 62 defining a mixing chamber 63 configured to receive the combined cold water stream 17 and the combined hot water stream 27. As detailed herein, the cold water stream 17 and the hot water stream 27 are configured to flow rotationally within the mixing chamber 63 to facilitate mixing. The mixer 20 includes a mixing element 64 which illustratively separates the combined cold water stream 17 into a plurality of component cold water streams 66, and separates the combined hot water stream 27 into a plurality of component hot water streams 68. Illustratively, the mixing element 64 further causes turbulent flow of the component cold water streams 66 and component hot water stream 68, thereby facilitating mixing to form combined mixed water stream 49 which is supplied to the mixed water outlet 50.

Figure 5:
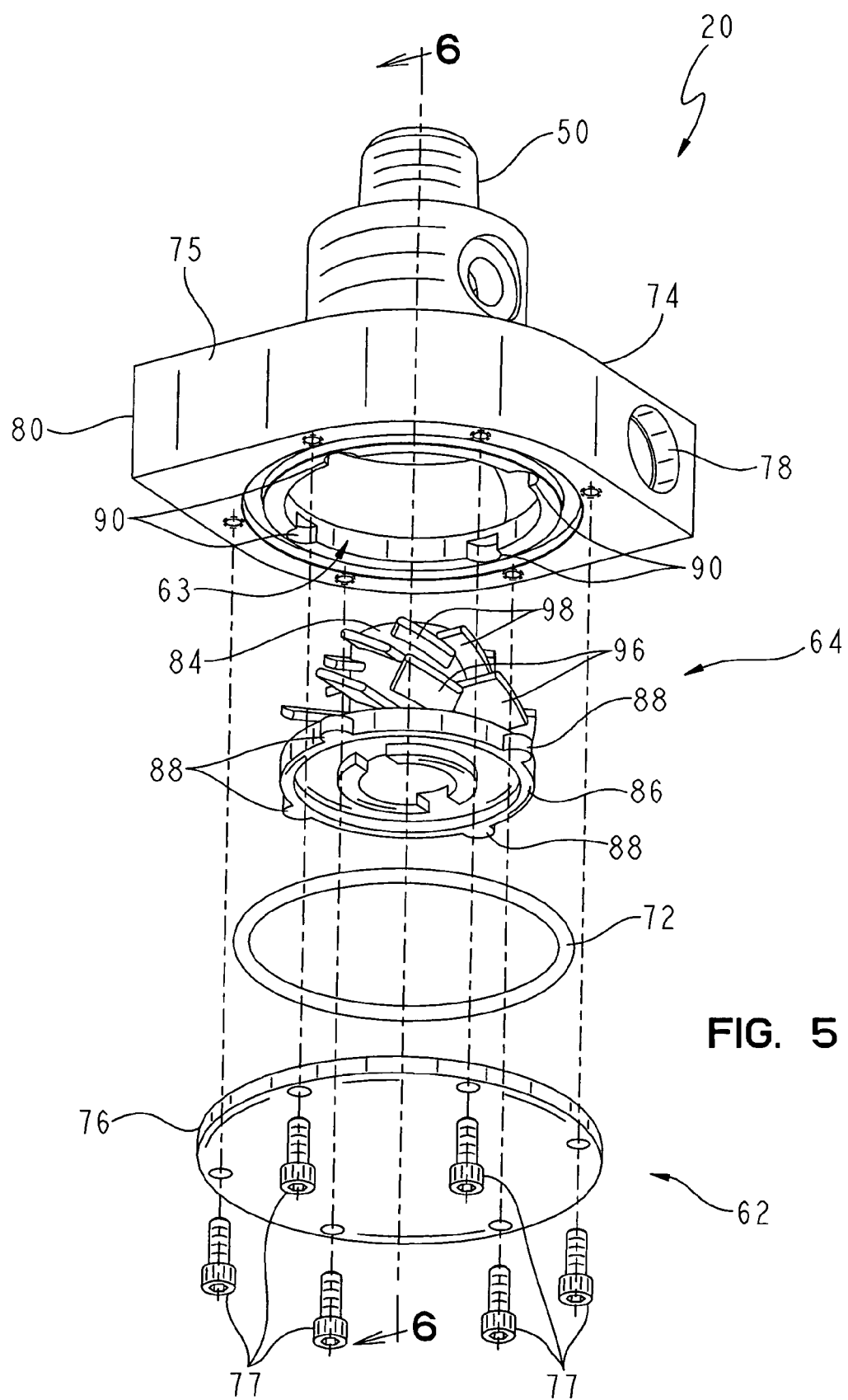
FIG. 5 is an exploded perspective view of the fluid mixer of FIG. 1.
Figure 6:
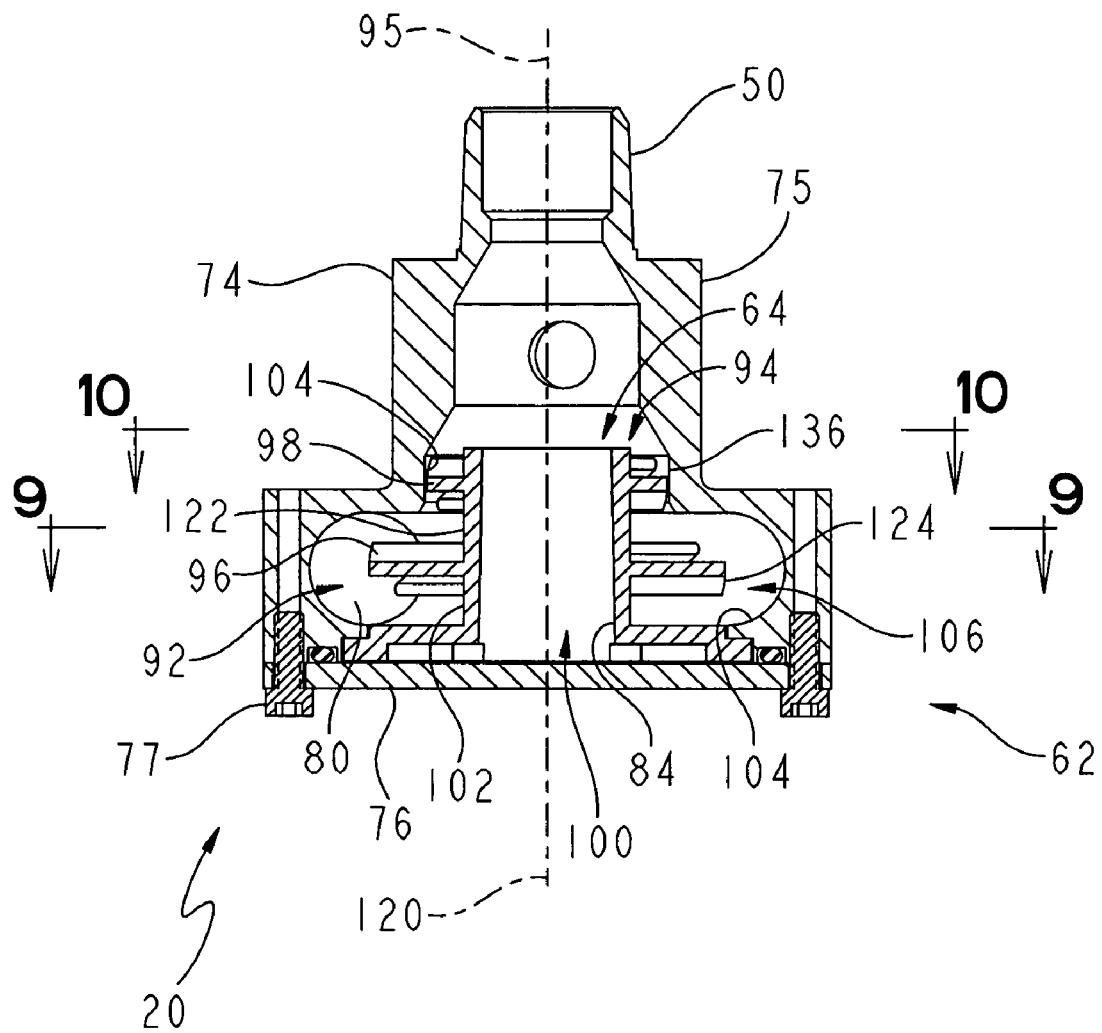
FIG. 6 is a cross-sectional view taken along line 6-6 of FIG. 5.
Figure 7:
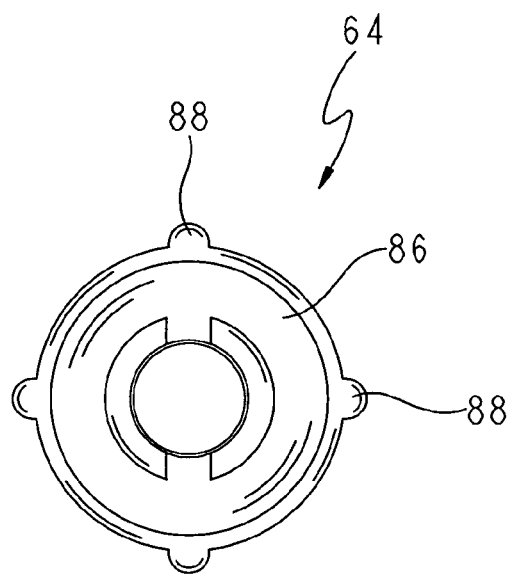
FIG. 7 is a top plan view of an illustrative mixing element of the present invention.
Figure 9:
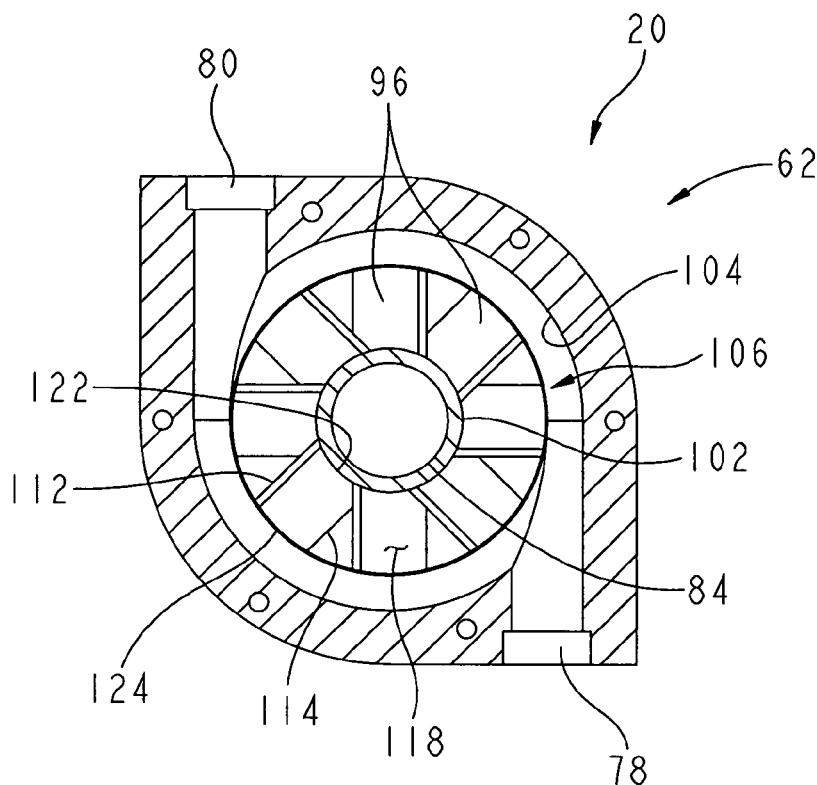
FIG. 9 is a cross-sectional view taken along line 9-9 of FIG. 6.

With further reference to FIGS. 5 and 6, the housing 62 includes a base 74, having an outer wall 75, and a cover 76. The mixing chamber 63 is defined therebetween the outer wall 75 and the cover 76. A conventional seal, such as an o-ring 72 may be positioned intermediate the base 74 and the cover 76. The cover 76 may be secured to the base 74 through conventional fasteners, such as bolts 77. A cold water inlet 78 is formed within the outer wall 75 and provides fluid communication between the mixing chamber 63 and the outlet 18 of the cold water valve 12. Similarly, a hot water inlet 80 is formed within the outer wall 75 and provides fluid communication between the mixing chamber 63 and the outlet 28 of the hot water valve 22. The cold water inlet 78 and the hot water inlet 80 are both tangentially disposed relative to the outer wall 75 defining the mixing chamber 63 (FIG. 9). Also, the inlets 78 and 80 arc disposed on opposite sides of the housing 62 such that the cold water stream 17 and the hot water stream 27 cooperate to provide a rotational flow or swirling motion within the mixing chamber 63.

With reference to FIGS. 5-8, the mixing element 64 is received within the mixing chamber 63 and includes a central hub 84 extending between a first end 83 and a second end 85. The first end 83 is supported on a base 86 including a plurality of mounting tabs 88 which are received within cooperating recesses 90 formed in the housing 62. Cooperation between the mounting tabs 88 and the recesses 90 prevents relative rotation between the mixing element 64 and the housing 62 in response to the rotational flow of water streams 17 and 27.

The mixing chamber 63 includes a first chamber 92 axially aligned with a second chamber 94. The outer wall 75 of the housing 62 is configured to cooperate with the mixing element 64 to redirect water flow from within the first chamber 92 by approximately 90 degrees along the longitudinal axis 95 of the housing 62. A plurality of first vanes or blades 96 extend laterally outwardly from the hub 84 and are positioned within the first chamber 92. Similarly, a plurality of second blades 98 extend laterally outwardly from the hub 84 and are positioned within the second chamber 94.

The hub 84 is illustratively cylindrical shaped and may comprise a tubular member defining a conduit 100. The hub 84 includes an outer surface 102 and the outer wall 75 of the housing 62 includes an inner surface 104. A toroidal shaped mixing passageway 106 is defined between the outer surface 102 and the inner surface 104.

The plurality of first blades 96 extend radially outwardly from the hub 84 and are circumferentially spaced in a first row 108 around the hub 84. Similarly, the plurality of second blades 98 extend radially outwardly from the hub 84 and are circumferentially spaced in a second row 110 around the hub 84. The first row 108 of blades 96 are spaced axially from the second row 110 of blades 98. While eight first blades 96 and eight second blades 98 are shown in the illustrative embodiment, this does not limit the scope of the invention and the particular number and orientation of the blades 96 and 98 may vary without limiting the scope of the invention.

Figure 8:
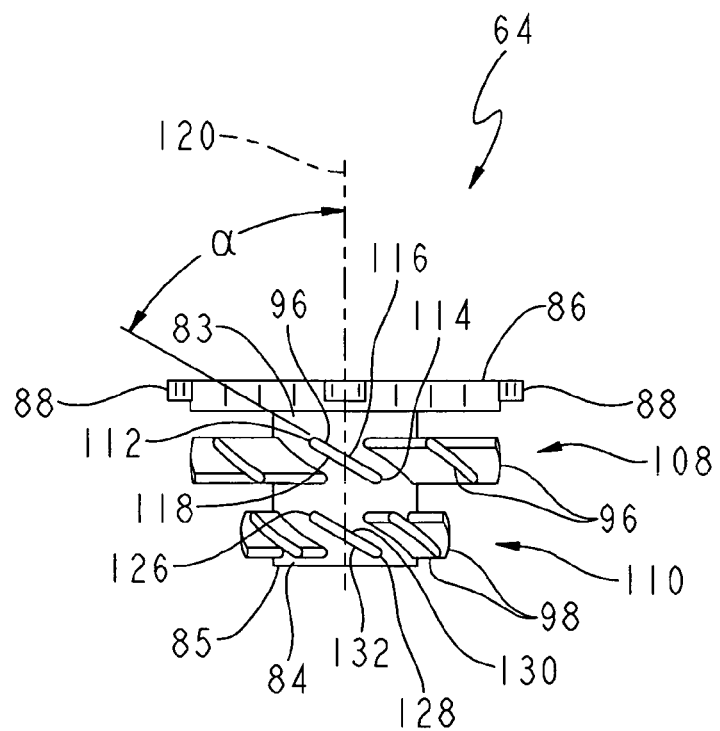
FIG. 8 is a side elevational view of the mixing element of FIG. 7.

With reference to FIGS. 8 and 9, each of the first blades 96 includes a leading edge 112 and a trailing edge 114. First and second contact surfaces 116 and 118 extend between the leading edge 112 and the trailing edge 114. The leading edge 112 of each blade is illustratively positioned in axially spaced relation to its trailing edge 114 in the direction of the longitudinal axis 120 of the hub 84 (FIG. 8). In other words, in the illustrative embodiment, the contact surfaces 116 and 118 are inclined by an angle α from the longitudinal axis 120 of the hub 84. Illustratively, the angle α is equal to approximately 60°, such that the blades 96 and 98 are angled by approximately 30° from the flow of water streams 17 and 27. This angular orientation facilitates impingement and redirection of the water streams 17 and 27, and hence the generation of turbulence within the water flow. Moreover, the impingement of the streams 17 and 27 on the blades 96 and 98 causes mixing of the water by sharp collision of the streams 17 and 27.

With reference to FIGS. 6 and 9, an inner side edge 122 of each first blade 96 is coupled to the outer surface 102 of the hub 84. An outer side edge 124 of each first blade 96 extends radially outwardly into the mixing passageway 106, approximately half the distance between the outer surface 102 of the hub 84 and the inner surface 104 of the outer wall 75. As such, the first blades 96 will separate, or shave off, portions of the water streams 17 and 27 rotationally flowing through the mixing passageway 106 to form the component water streams 66 and 68, respectively.

As further shown in FIGS. 8 and 9, the inner portions of the first blades 96 (i.e. adjacent to the inner side edges 122) are positioned in a circumferentially overlapping arrangement. In other words, adjacent the inner side edges 122, the leading edge 112 of each blade 96 is positioned in vertically spaced relation, directly above or below, the first contact surface 116 of a first adjacent blade 96, and the trailing edge 114 of each blade 96 is positioned in vertically spaced relation, directly above or below, the second contact surface 118 of a second adjacent blade 96.

Figure 10:
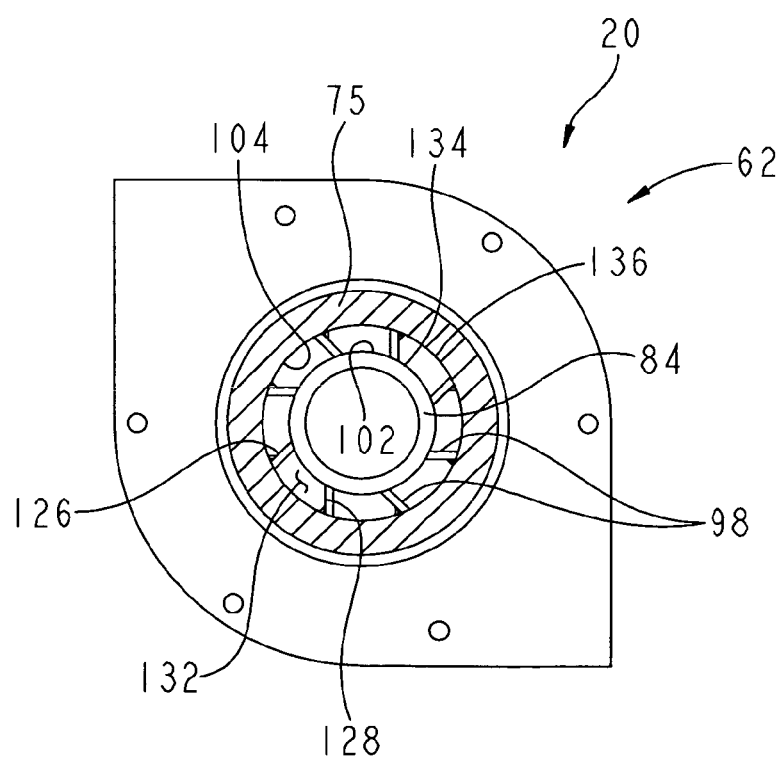
FIG. 10 is a cross-sectional view taken along line 10-10 of FIG. 6.

As shown in FIGS. 8 and 10, the second blades 98 are similar to the first blades 96 as including axially spaced leading and trailing edges 126 and 128, defining angled first and second contact surfaces 130 and 132. The second blades 98 are positioned in a circumferentially overlapping arrangement, where the leading edge 126 of each blade 98 overlaps the trailing edge 128 of an adjacent blade 98. In other words, the leading edge 126 of each blade 98 is positioned in vertically spaced relation, directly above or below, the first contact surface 130 of a first adjacent blade 98, and the trailing edge 128 of each blade 98 is positioned in vertically spaced relation, directly below or above, the second contact surface 132 of a second adjacent blade 98. Additionally, the blades 98 each include an inner side edge 134 coupled to the outer surface 102 of the hub 84. An outer side edge 136 of each blade 98 extends substantially the full distance between the outer surface 102 of the hub 84 and the inner surface 104 of the outer wall 75. As such, turbulence is increased in water flowing to the outlet 50.

Figure 11:
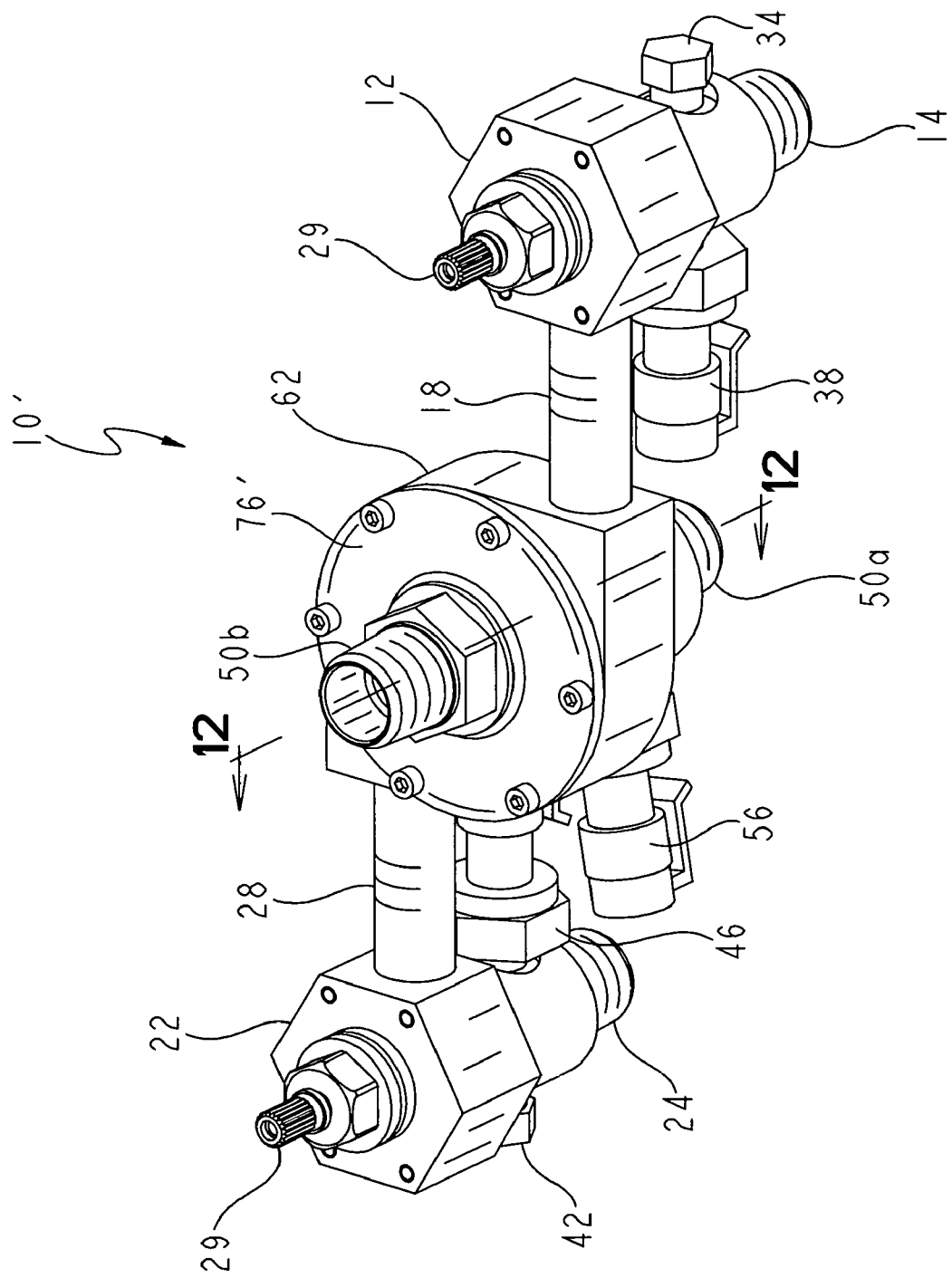
FIG. 11 is a perspective view of a further illustrative embodiment fluid delivery system incorporating a fluid mixer according to the present invention, with the servo motors removed to reveal the valving members.
Figure 12:
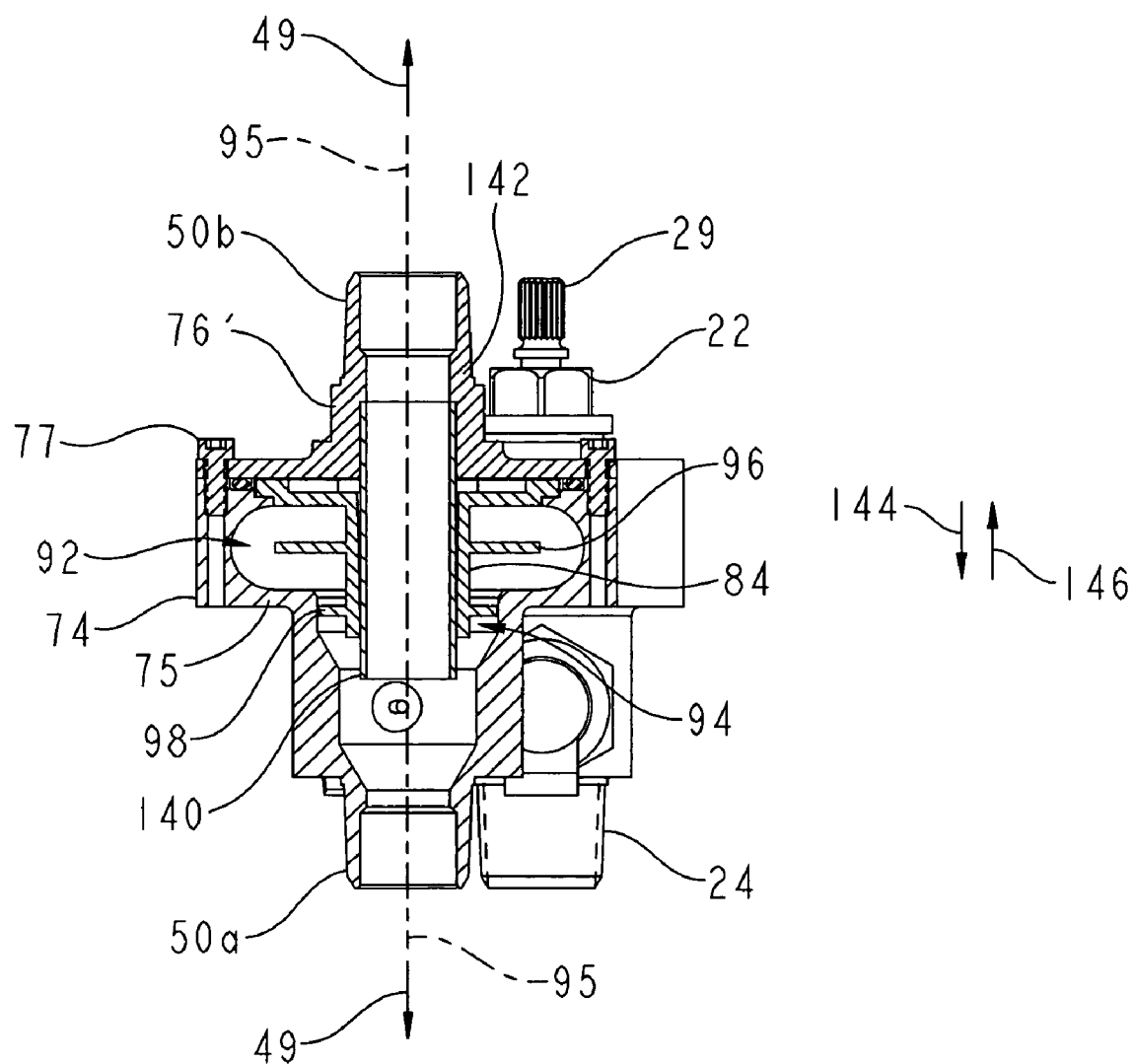
FIG. 12 is a cross-sectional view taken along line 12-12 of FIG. 11.

With reference now to FIGS. 11 and 12, a further illustrative embodiment fluid delivery system 10' is shown. The fluid delivery system 10' includes many components similar to the fluid delivery system 10 illustrated in FIGS. 1 and 2. As such, similar components are identified with like reference numbers. The fluid delivery system 10 (FIGS. 1 and 6) is often called a three-way system since it includes a cold water inlet 14, a hot water inlet 24, and a single mixed water outlet 50. The fluid delivery system 10' (FIGS. 11 and 12) is often called a four-way system since it includes a cold water inlet 14, a hot water inlet 24, and two mixed water outlets 50a and 50b.

As shown in the fluid delivery system 10' of FIG. 12, the conduit 100 of the hub 84 of mixing element 64 receives an inner tubular member 140. The tubular member 140 defines a mixed water passageway 141. The cover 76' of the housing 62 includes an axially extending boss 142 similarly receiving the inner tubular member 140. The mixed water stream 49 may flow in a first direction (arrow 144) from the mixing element 64 to the first outlet 50a. Upon operation of a conventional diverter (not shown), the mixed water stream 49 may flow in a second direction (arrow 146) opposite the first direction through the mixed water passageway 141 and to the second outlet 50b. Illustratively, the first outlet 50a is operably coupled to a first fluid delivery device 150, such as a tub spout, while the second outlet 50b is operably coupled to a second fluid delivery device 152, such as a shower head.

Referring now to FIGS. 13-15, alternative illustrative embodiments of the mixing element 64 are shown. Mixing elements 264, 364 and 464 all include certain components which are substantially similar to those identified above with respect to mixing element 64. As such, similar components are identified with like reference members.

With reference to FIG. 13, mixing element 264 includes a plurality of circumferentially spaced blades 266 which extend axially along the outer surface 102 of the hub 84 from the first end 83 adjacent the base 86 to the second end 85. In a transverse plane, each blade 266 extends arcuately outwardly from the outer surface 102 to an outer edge 267 of the base 86. More particularly, each blade 266 includes a first end 268 positioned at the hub 84, and a second end 270 tangentially disposed relative to the outer edge 267 of the base 86. In an axial plane, each blade 266 extends arcuately outwardly from the second end of the hub 84 toward the base. The blades 266 are configured to separate, or shave-off, layers from the cold and hot water streams 17 and 27.

FIG. 14 illustrates mixing element 364 which includes a pair of arcuate walls 366 extending in an axial direction from the base toward the second end of the hub. The walls 366 cooperate with the housing 62 to cause water streams 17 and 27 to rotate a minimum angular distance within the mixing chamber 63 before exiting toward the outlet 50.

FIG. 15 illustrates mixing element 464 which includes an annular ring 466 supported at the second end 85 of the hub 84

Again, the annular ring 466 is configured to prevent early exiting of water streams 17 and 27 and to facilitate mixing by inducing turbulence.

Although the invention has been described in detail with reference to certain preferred embodiments, variations and modifications exist within the spirit and scope of the invention as described and defined in the following claims.

The invention claimed is:

1. A fluid mixer comprising:
   a housing including an outer wall defining a mixing chamber;
   a cold water inlet in fluid communication with the mixing chamber and configured to supply a combined cold water stream to the mixing chamber;
   a hot water inlet in fluid communication with the mixing chamber and configured to supply a combined hot water stream to the mixing chamber;
   a mixed water outlet in fluid communication with the mixing chamber and configured to receive a combined mixed water stream from the mixing chamber;
   a stationary mixing element received within the mixing chamber and restrained from rotating relative to the housing, the mixing element including a hub and a plurality of blades extending outwardly from the hub; and
   a mixing passageway defined within the mixing chamber intermediate the hub of the mixing element and the outer wall of the housing, wherein the cold water inlet and the hot water inlet are arranged to impart rotational flow to the combined cold water stream and the combined hot water stream within the mixing passageway, and the plurality of blades extend transverse to the mixing passageway.

2. The fluid mixer of claim 1, wherein the plurality of blades are configured to separate the combined cold water stream into a plurality of component cold water streams, and to separate the combined hot water stream into a plurality of component hot water streams.

3. The fluid mixer of claim 2, wherein the plurality of blades are further configured to turbulently mix the component cold water streams and the component hot water streams into the combined mixed water stream provided to the water outlet.

4. The fluid mixer of claim 1, wherein the housing is configured to redirect the combined mixed water stream in a perpendicular direction to the mixing passageway and to the mixed water outlet.

5. The fluid mixer of claim 1, wherein the plurality of blades comprises a plurality of circumferentially spaced first blades and a plurality of circumferentially spaced second blades, the first blades being axially spaced from the second blades.

6. The fluid mixer of claim 1, wherein the hub comprises a tubular member defining a fluid conduit to the mixed water outlet.

7. The fluid mixer of claim 1, further comprising a base coupled to the hub, the base including a plurality of mounting tabs, wherein the housing includes a plurality of recesses to receive the plurality of mounting tabs to restrain the base from rotating relative to the housing.

8. The fluid mixer of claim 1, wherein each of the plurality of blades extends approximately half the distance across the mixing passageway.

9. The fluid mixer of claim 1, further comprising:
   cold water valve coupled to the cold water inlet;
   a hot water valve coupled to the hot water inlet; and
   a controller operably coupled to the cold water valve and the hot water valve, the controller being configured to adjust the cold water valve and the hot water valve to regulate a mixed water temperature of the mixed water to substantially correspond to a desired water temperature.

10. A method of mixing a hot water stream and a cold water stream to produce a mixed water stream, the method comprising the steps of:
    providing a mixing passageway;
    supplying a combined cold water stream to the mixing passageway;
    rotating the combined cold water stream within the mixing passageway;
    supplying a combined hot water stream to the mixing passageway;
    rotating the combined hot water stream within the mixing passageway;
    separating the combined cold water stream into a plurality of component cold water streams by directing the combined cold water stream toward a stationary mixing element;
    separating the combined hot water stream into a plurality of component hot water streams by directing the combined hot water stream toward the stationary mixing element; and
    mixing the component cold water streams with the component hot water streams into a combined mixed water stream.

11. The method of claim 10, further comprising the step of adjusting the flow of at least one of the cold water stream and the hot water stream to control the temperature of the combined mixed water stream.

12. The method of claim 10, wherein the step of mixing includes imparting turbulence to the component cold water streams and the component hot water streams.

13. The method of claim 12, wherein the step of mixing further includes providing a plurality of blades and causing the component cold water streams and the component hot water streams to impinge on the blades, thereby causing sharp collision of the water streams.

14. The method of claim 10, further comprising the step of redirecting the combined mixed water stream in a perpendicular direction to the mixing passageway and to a mixed water outlet.

15. A fluid mixer comprising:
    a housing including a first chamber and a second chamber in longitudinally spaced relation to the first chamber;
    a stationary hub positioned within the housing;
    a plurality of first blades extending laterally outwardly from the hub, positioned within the first chamber and restrained from rotating relative to the first chamber;
    a plurality of second blades extending laterally outwardly from the hub, the second blades being positioned within the second chamber in spaced relation to the plurality of first blades and restrained from rotating relative to the second chamber; and
    an outlet in fluid communication with the second chamber.

16. The fluid mixer of claim 15, further comprising at least one fluid inlet in fluid communication with the first chamber, the at least one fluid inlet being tangentially oriented relative to the first chamber to cause rotational flow of fluid provided by the at least one fluid inlet.

17. The fluid mixer of claim 15, wherein the hub comprises a tubular member defining a fluid conduit to the outlet.

18. The fluid mixer of claim 15, further comprising a base coupled to the hub, the base including a plurality of mounting tabs, wherein the housing includes a plurality of recesses to receive the plurality of mounting tabs to restrain the base from rotating relative to the housing.

19. The fluid mixer of claim 15, wherein each of the plurality of first blades extends approximately half the distance from the hub to the housing within the first chamber.

20. The fluid mixer of claim 15, wherein each of the plurality of second blades extends substantially the full distance from the hub to the housing within the second chamber.

21. The fluid mixer of claim 15, wherein the plurality of first blades are positioned in at least a partially overlapping arrangement.

22. The fluid mixer of claim 15, wherein the plurality of second blades are positioned in an overlapping arrangement.

23. A fluid mixer comprising:
a housing defining a mixing chamber;
a cold water inlet in fluid communication with the mixing chamber and configured to supply cold water;
a hot water inlet in fluid communication with the mixing chamber and configured to supply hot water;
a mixing element including a hub positioned within the housing, the mixing element being configured to combine the cold water and the hot water to produce a mixed water;
a mixed water passageway extending through the hub;
a first outlet in fluid communication with the mixing chamber and the mixed water passageway; and
a second outlet in fluid communication with the mixing chamber and the mixed water passageway, wherein the mixed water passageway is in spaced relation to the first outlet, and the mixed water passageway fluidly connects the mixing chamber to the second outlet.

24. The fluid mixer of claim 23, wherein the mixed water is configured to flow in a first direction from the mixing chamber to the first outlet, and the mixed water is configured to flow in a second direction opposite the first direction from the mixing chamber to the second outlet.

25. The fluid mixer pf claim 23, wherein the first outlet is in fluid communication with a first fluid delivery device, and the second outlet is in fluid communication with a second fluid delivery device.

26. The fluid mixer of claim 23, wherein the mixing element further includes a plurality of blades extending outwardly from the hub.

* * * * *